United States Patent [19]
Adedeji et al.

[11] Patent Number: 6,037,410
[45] Date of Patent: Mar. 14, 2000

[54] SEMI-TRANSPARENT BLENDS OF POLYPHENYLENE ETHER AND STYRENIC RADIAL BLOCK COPOLYMERS

[75] Inventors: Adeyinka Adedeji, Albany, N.Y.; Johan Masschelein, Westmalle, Belgium

[73] Assignee: General Electric Co., Pittsfield, Mass.

[21] Appl. No.: 09/003,387

[22] Filed: Jan. 6, 1998

[51] Int. Cl.[7] .................................................. C08L 53/02
[52] U.S. Cl. ........................................ 525/92 D; 525/534
[58] Field of Search .................................... 525/92 D, 534

[56] References Cited

U.S. PATENT DOCUMENTS

| | | |
|---|---|---|
| 3,383,435 | 5/1968 | Clzck . |
| 4,097,550 | 6/1978 | Haaf et al. . |
| 4,101,503 | 7/1978 | Cooper et al. . |
| 4,101,504 | 7/1978 | Cooper et al. . |
| 4,101,505 | 7/1978 | Cooper et al. . |
| 4,113,800 | 9/1978 | Lee, Jr. . |
| 4,128,602 | 12/1978 | Katchman et al. . |
| 4,139,574 | 2/1979 | Cooper et al. . |
| 4,154,712 | 5/1979 | Lee, Jr. . |
| 5,324,769 | 6/1994 | Richards et al. ........................ 524/505 |
| 5,336,719 | 8/1994 | Thompson et al. ....................... 525/71 |

FOREIGN PATENT DOCUMENTS 06088018  3/1994  Japan .

*Primary Examiner*—Robert Dawson
*Assistant Examiner*—D. Aylward

[57] ABSTRACT

The invention relates to process for the manufacture of a semi-transparent thermoplastic composition of a polyphenylene ether resin and a styrenic radial block copolymer. The compositions made by the process of the invention may also contain crystal polystyrene resin and exhibit enhanced physical properties, especially ductility. The invention also relates to articles formed out of the compositions made by the process of the invention.

13 Claims, No Drawings

SEMI-TRANSPARENT BLENDS OF POLYPHENYLENE ETHER AND STYRENIC RADIAL BLOCK COPOLYMERS

CROSS-REFERENCE TO RELATED APPLICATIONS

Not applicable.

FEDERALLY SPONSORED RESEARCH

Not applicable.

BACKGROUND OF THE INVENTION

1. Field of the Invention

The invention relates to a process for the manufacture of a semi-transparent thermoplastic composition of a polyphenylene ether resin and a styrenic radial block copolymer wherein the processes comprises melt-mixing the polyphenylene ether resin in a powder form with the styrenic radial block copolymer. The composition of the invention may also contain polystyrene resin.

The invention also relates to articles formed out of the compositions made by the process of the invention.

2. Brief Description of the Related Art

In the food handling area, clamshell styled containers having an opaque bottom and a see-through top are in great demand for prepared foods. Busy consumers desire to purchase entrees at a local store or restaurant and take the meal home for the family meal. Reheating the food in a microwave oven is often the method of choice because of convenience and time and consequently the clamshell styled containers must have sufficient heat resistance to withstand steam and hot greases and oils. Additionally, the containers must have sufficient ductility to not break on handling and use by both the food preparer and the consumer.

In order to achieve great penetration into the clamshell styled container market, a resin needs to be of low cost and have outstanding processability, have sufficient transparency for food to be seen through the container top, have sufficient ductility to withstand breakage, and be able to resist hot greases and oils from foods on heating in a microwave oven.

Polystyrene resins are widely used thermoplastic resins because of their low cost and easy processability. These resins are available as homopolymer polystyrene (often called crystal polystyrene), as block copolymers with elastomeric materials (e.g., S-B-S, S-(EB)-S, S-EP copolymers), and as impact modified graft resins with polybutadiene resin (HIPS). Within these categories, there are flame-retardant, abrasion resistant, super-tough, UV-resistant, expandable, and environmental stress crack resistant grades that enable these resins to be used in a wide variety of everyday consumer goods such as toys, packaging, housewares, construction materials, automobile parts, and disposables.

Polystyrene resins are currently used in many clamshell designed containers, both in foamed opaque clamshells and in containers having see-through lids. Unfortunately, the properties of the various polystyrene resins are insufficient albeit for different reasons for great penetration into the market for clamshell styled containers having an opaque bottom and a see-through top. For example, crystal polystyrene is insufficient in ductility although acceptable in cost, processing, and transparency for the top. Addition of rubbery styrenic copolymers (S-B-S, S-EB-S) to crystal polystyrene improves the ductility but at the expense of the necessary transparency. High impact polystyrene (i.e., HIPS) has good impact strength but is not transparent. Polystyrene-butadiene radial block copolymers containing over fifty percent styrene exhibit good ductility, cost, and transparency but are insufficient in heat resistance.

Poly(phenylene ether) resins (referred to hereafter as "PPE") are commercially attractive materials because of their unique combination of physical, chemical, and electrical properties. Commercially, most PPE are sold as blends with predominantly high impact polystyrene resins. PPE are miscible with polystyrene resins in all proportions and because of the very high glass transition temperatures of PPE, the blends of PPE with polystyrene resins possess higher heat resistance than that of the polystyrene resins alone. Moreover, the combination of PPE with high impact polystyrene resins results in additional overall properties such as high flow and ductility, however, such blends are not transparent or even semi-transparent. Examples of such blends can be found in U.S. Pat. Nos. 3,383,435; 4,097,550; 4,113,800; 4,101,503, 4,101,504; 4,101,505; 4,128,602; 4,139,574; and 4,154,712 among others. The properties of these blends can be further enhanced by the addition of various additives such as impact modifiers, flame retardants, light stabilizers, processing stabilizers, heat stabilizers, antioxidants and fillers but none of these additives results in transparent or semi-transparent compositions that would be useful for the aforementioned clamshell styled containers having a see-through top. Moreover, the melt blending of styrene-butadiene radial block copolymer, wherein the styrene content in the copolymer is at least 50% by weight based on the weight of the copolymer, with pellets of PPE or PPE blended with high impact polystyrene results in degradation of the styrene-butadiene radial block copolymer and sheet made the composition has an unacceptable surface quality, including unacceptable gels.

It is therefore apparent there continues to be a need for improved compositions as well as processes to manufacture compositions containing polystyrene resins that have acceptable ductility, heat resistance, and transparency for use in clamshell styled containers having a see-through top.

SUMMARY OF THE INVENTION

The needs discussed above have been generally satisfied by the discovery of a process for the manufacture of a semi-transparent thermoplastic composition containing:

a) a polyphenylene ether resin, and b) a styrene-butadiene radial block copolymer, wherein the styrene content in the copolymer is at least 50% by weight based on the weight of the copolymer, and wherein the butadiene block length and structure results in butadiene domains that are smaller than the wavelength of visible light;

wherein the process comprises melt-mixing the polyphenylene ether resin in a powder form with the styrenic radial block copolymer. The process may optionally include melt mixing crystal polystyrene with the polyphenylene ether resin, and styrene-butadiene radial block copolymer.

The description which follows provides further details regarding this invention.

DESCRIPTION OF THE DRAWINGS

Not applicable.

DETAILED DESCRIPTION OF THE INVENTION

Polyphenylene ether resins are a well known class of compounds sometimes referred to as polyphenylene oxide resins. Examples of suitable PPE and processes for their preparation can be found in, for example, U.S. Pat. Nos. 3,306,874; 3,306,875; 3,257,357; and 3,257,358. Compositions of the present invention will encompass homopolymers, copolymers and graft copolymers obtained by the oxidative coupling of phenolic compounds. The preferred PPE used in compositions of the present invention are derived from 2,6-dimethyl phenol. Also contemplated are PPE copolymers derived from 2,6-dimethyl phenol and 2,3,6-trimethyl phenol.

Useful PPE include poly(2,6-dimethyl-1,4-phenylene ether) resin having an intrinsic viscosity (I.V.) of between about 0.15 and about 0.60 dl/g as measured in toluene at 25° C. and a concentration of 0.6 gram per 100 ml. In a preferred embodiment of the invention, the PPE have an intrinsic viscosity (I.V.) of between about 0.25 and about 0.35 dl/g as measured in toluene at 25° C. and a concentration of 0.6 gram per 100 ml.

The present compositions also contain, as component B, a styrene-butadiene radial block copolymer, wherein the styrene content in the copolymer is at least 50% by weight based on the weight of the copolymer, and wherein the butadiene block length and structure results in butadiene domains that are smaller than the wavelength of visible light. When the butadiene block length and structure results in butadiene domains that are larger than the wavelength of visible light, the transparency of the compositions is unacceptable. The composition may optionally contain crystal polystyrene.

These radial block copolymers are derived from vinyl aromatic monomers and conjugated diene monomers and are also well known in the art. The preferred vinyl aromatic monomer is styrene and the preferred conjugated diene monomer is 1,3-butadiene. Copolymers of this type generally comprise from about 60 to about 95 percent by weight polymerized vinyl aromatic monomer and about 40 to about 5 percent by weight polymerized conjugated diene monomer.

By radial block copolymer is meant a radial architecture wherein the copolymer has at least three polymer chains which form a radial configuration, and each chain usually terminates with a substantially non-elastomeric segment (the polymerized vinyl aromatic monomer segment), to which an elastomeric polymer segment is joined (the polymerized conjugated diene monomer segment). These radial block copolymers are also referred to "polymodal branched block copolymers" and "star polymers".

The production of radial block copolymers is broadly disclosed in U.S. Pat. Nos. 3,639,517; 4,091,053; and 4,584,346, the disclosures of which are hereby incorporated by reference. Briefly, polymerization involves the first addition of a monovinyl-substituted aromatic component monomer (e.g., styrene) along with an organolithium initiator to produce a group of monovinyl-substituted aromatic component polymer blocks terminated with lithium atoms followed by the introduction of additional initiator and additional monovinyl-substituted aromatic compound monomer so as to produce a second group of monovinyl-substituted aromatic component polymer blocks also terminated with lithium atoms. Thereafter, the conjugated diene monomer (e.g., 1,3-butadiene) is introduced to form chains consisting of monovinyl-substituted aromatic component-diene blocks terminated with lithium atoms having varying lengths because of the multiple addition of the monovinyl-substituted aromatic compound monomer and initiator. Thereafter, a polyfunctional coupling agent having at least three functional groups per molecule is employed to join together a plurality of these chains so as to form polymer molecule having terminal polymerized monovinyl-substituted aromatic component blocks. These block copolymers are commercially available under the tradename K-Resin from Phillips Petroleum.

The radial block polymers of component B are further characterized as follows: the polymerized monovinyl-substituted aromatic compound monomer content in the relatively high molecular weight diblock polymer chains produced by the first addition of monomer and initiator and conjugated diene addition is calculated to be less than 90 weight percent, preferably 80 to 89, more preferably 84 to 85 weight percent. The polymerized monovinyl-substituted aromatic compound monomer content in the relatively low molecular weight diblock polymer chains produced as a result of the second addition of monomer and initiator and conjugated diene addition is greater than 46 weight percent, preferably 47 to 70, more preferably 49 to 67 weight percent.

The ratio of the calculated number average molecular weight of the polymerized monovinyl-substituted aromatic compound monomer block in the high and low molecular weight portions (portions resulting from the first and second initiator and monovinyl-substituted aromatic compound monomer additions, respectively) is 3 to 7, preferably 3.5 to 4.8. The ratio of the calculated number average molecular weight of the total monovinyl-substituted aromatic compound-diene block of the high and low molecular weight portions respectively, is less than 4.5, preferably 2 to 4, more preferably 2.5 to 3.3.

The copolymers have a total weight percent monovinyl-substituted aromatic compound content within the range of 65 to 80, more preferably 75 to 77, most preferably about 76 weight percent.

In some embodiments, compositions of the present invention are further enhanced by the inclusion of homopolystyrene resin, commonly called crystal polystyrene resin. When used, the level ranged from about 1% by weight to about 70% by weight, preferably from about 1% by weight to about 60% by weight, based on the weight of the entire composition.

In some preferred embodiments, it should be clear that the thermoplastic compositions made by the process of the present invention are substantially free of other thermoplastic resins with the exception of the optional homopolystyrene resin. The other thermoplastic resins that the compositions should be substantially free of include polyamide resins, high impact polystyrene resins, polyester resins, polycarbonate resins, polysulfone resins, polyarylate resins, polyphenylene sulfide resins, and polyetherimide resins as well as various mixtures of other thermoplastic resins. By "substantially free" is meant that the compositions contain less that 5% by weight, preferably less than 3% by weight, more preferably less that 1% by weight, and most preferable essentially none of the other thermoplastic resins, wherein all percentages by weight are based upon the entire weight of the composition. It should also be clear that the thermoplastic compositions made by the process of the present invention are free of other thermoplastic resins with the exception of the optional homopolystyrene resin.

The thermoplastic composition of the invention may comprise any of the following additives: stabilizers, dyes, and pigments.

A suitable level of the various components depends on several factors, such as the end-use of the product, the level of impact strength desired, and the particular type and characteristics of other components which are present.

Usually, about 5% by weight to about 70% by weight of PPE is present, based on the weight of the entire composition. In one preferred embodiment, the level is about 5% by weight to about 30% by weight, wherein all weights are based upon the weight of the entire composition. In another preferred embodiment, the level of PPE that is present in the compositions is that which results in a composition having a heat distortion temperature of at least about 170° F., preferably of at least about 180° F. when measured at 264 psi under the test conditions described within ASTM D 648.

The compositions of the present invention can be prepared by a variety of methods involving intimate admixing of the materials with any additional additives desired in the formulation. A preferred procedure includes melt blending, although solution blending is also possible. Because of the availability of melt blending equipment in commercial polymer processing facilities, melt processing procedures are generally preferred. Examples of equipment used in such melt compounding methods include: co-rotating and counter-rotating extruders, single screw extruders, disc-pack processors and various other types of extrusion equipment. The temperature of the melt in the present process is preferably minimized in order to avoid excessive degradation and gel formation in the styrene-butadiene copolymer. It is desirable to maintain the melt temperature between about 200° C. and about 330° C., although higher temperatures can be used provided that the residence time of the resin in the processing equipment is kept short. In some instances, the compounded material exits the extruder through small exit holes in a die and the resulting strands of molten resin are cooled by passing the strands through a water bath. The cooled strands can be chopped into small pellets for packaging and further handling.

The physical form and size of the PPE is important to obtaining a smooth surface composition with a low gel content. As the PPE particle size increases, the shear heating in the compounding equipment is increased and the styrene-butadiene copolymer degrades and becomes crosslinked. The cross-linked material may appear as unacceptable gels on the surface of an extruded sheet of the composition. In order to minimize the formation of gels, the use PPE powder is preferred in process of the present invention. By powder is meant a PPE particle size wherein at least 80 weight percent of the PPE will pass through a 3000 micron sieve, more preferably at least 90 weight percent will pass through a 2000 micron sieve. Typically, the PPE used in the present invention is in the form as collected after precipitation with a non-solvent, e.g., methanol, from the reaction polymerization medium, e.g., toluene. Larger PPE particles may be utilized with acceptable results when homopolystyrene resin is also present in the process.

It should be clear that thermoplastic compositions made by the process described herein are another embodiment of the present invention. It should also be clear that articles formed out of the thermoplastic compositions described herein are another embodiment of the present invention.

All patents cited are incorporated herein by reference.

The invention will be further illustrated by the following examples.

Experimental

In the examples the following materials have been used:

PPE: a poly(2,6-dimethyl-1,4-phenylene ether) with an intrinsic viscosity of 30 ml/g as measured in toluene at 25° C. and a concentration of 0.6 gram per 100 ml;

KR-05: a radial block copolymer of polystyrene and polybutadiene and having an overall styrene content of about 75% by weight and commercially available from Phillips Chemical Company;

PS: crystal polystyrene resin available from BASF and Chevron as grades 1800P and EB3300, respectively; and HIPS: high impact polystyrene available from Chevron as grade MA5350, Valtra 7023.

The ingredients were compounded in the weight ratios as indicated in the following table in a twin-screw extruder with temperature settings over the length of the extruder between about 280 and about 310° C. The screw speed was 300 rpm, the throughput 10 kilograms per hour. All ingredients were fed at the throat of the extruder. The strands coming from the extruder were pelletized and dried for about 3 hours at about 110° C. The dried pellets were injection molded into standard ASTM test specimens for measurement of physical properties.

TABLE 1

| Sample | 1 | 2 | 3 | 4 | 5 | 6 | 7 | 8 | 9 | 10 |
|---|---|---|---|---|---|---|---|---|---|---|
| PPE |  |  |  | 30 | 5 | 15 | 30 | 50 | 20 | 40 |
| PS | 100 |  |  | 70 |  |  |  |  | 40 | 20 |
| HIPS |  | 100 |  |  |  |  |  |  |  |  |
| KR-05 |  |  | 100 |  | 95 | 85 | 70 | 50 | 40 | 40 |
| properties: |  |  |  |  |  |  |  |  |  |  |
| clarity | yes | no | yes | yes | yes | yes | yes | yes | yes | Yes |
| HDT @ 264 psi, ° F. | 192 | 180 | 156 | 237 | 162 | 178 | 207 | 245 | 201 | 230 |
| notched Izod, ft-lbs/in | 0.42 | 3.02 | 1.68 | 0.26 | 0.57 | 0.91 | 1.07 | 0.81 | 0.45 | 0.6 |
| Dynatup impact, ft-lbs | 1.35 | 10.8 | 29.21 | — | 16.8 | 24.6 | 25.9 | 27.4 | 2.0 | 1.3 |
| Flexural Modulus, kpsi | 468 | 295 | 213 | 462 | 174 | 224 | 251 | 299 | 332 | 316 |
| Flexural energy @ break, lb/in | 29 | 21 | 17 | 17 | 15 | 19 | 23 | 29 | 30 | 38 |
| Tensile strength @ yield, psi | 9655 | 4730 | 3947 | 10900 | 3763 | 4700 | 6238 | 8447 | 7894 | 8544 |
| Tensile elongation @ break, % | 9 | 70 | 210 | 8 | 245 | 51 | 25 | 22 | 14 | 19 |

Examination of the properties of samples 1, 2, and 3 reveals some of the problems with styrenic-based resins for food container applications. As seen by these data, the ductility is poor for crystal polystyrene (sample 1), or the clarity is absent for high impact polystyrene (sample 2), or the heat distortion temperature is too low (sample 3). The addition of PPE to crystal polystyrene (sample 4) increases the heat resistance but the ductility is still deficient. Moreover, addition of PPE to HIPS leads to compositions that are not transparent or even semi-transparent. Addition of PPE to a radial block copolymer of polystyrene and polybutadiene and having an overall styrene content of about 75% by weight (samples 5 to 8) unexpectedly lead to an outstanding balance of properties, including the required degree of transparency for food to be observed through a clam-shell top. Samples 9 and 10 illustrate that crystal polystyrene may be added to the compositions of PPE and radial block copolymer to further refine the properties (such as rigidity) and cost of the composition.

The preceding examples are set forth to illustrate specific embodiments of the invention and are not intended to limit its scope. It should be clear that the present invention includes articles from the compositions as described herein. Additional embodiments and advantages within the scope of the claimed invention will be apparent to one or ordinary skill in the art.

We claim:

1. A process for the manufacture of a thermoplastic composition comprising:
   (a) a polyphenylene ether resin, and
   (b) a styrene-butadiene radial block copolymer, wherein the styrene content in the copolymer is at least 50% by weight based on the weight of the copolymer, and wherein the butadiene block length and structure results in butadiene domains that are smaller than the wavelength of visible light;
   wherein said process comprises melt-mixing the polyphenylene ether resin in a powder form with the styrene-butadiene radial block copolymer.

2. The process of claim 1, wherein the styrene content in the styrene-butadiene radial block copolymer is between about 65% and 80% by weight based on the weight of the copolymer.

3. The process of claim 1, wherein at least 80 weight percent of the polyphenylene ether resin in a powder form will pass through a 3000 micron sieve.

4. The process of claim 1, wherein at least 90 weight percent of the polyphenylene ether resin in a powder form will pass through a 2000 micron sieve.

5. The process of claim 1, wherein the polyphenylene ether resin is present from about 5 to about 70 percent by weight based upon the weight of the entire composition.

6. The process of claim 3, wherein the composition has a heat distortion temperature of at least about 170° F. when measured at 264 psi under the test conditions described within ASTM D 648.

7. The process of claim 1, wherein the styrene content in the copolymer is about 75% to about 77% by weight based on the weight of the radial block copolymer.

8. The process of claim 1, further comprising a crystal polystyrene resin.

9. The process of claim 1, further comprising an additive selected from the group consisting of stabilizers, dyes, pigments, and mixtures thereof.

10. The process of claim 1, wherein the composition is substantially free of polyamide resins, high impact polystyrene resins, polyester resins, polycarbonate resins, polysulfone resins, polyarylate resins, polyphenylene sulfide resins, polyetherimide resins, and mixtures of the foregoing.

11. A thermoplastic composition made by the process of claim 1.

12. Articles formed out of the composition made by the process of claim 1.

13. A process for the manufacture of a thermoplastic composition consisting essentially of:
   (a) a polyphenylene ether resin, and
   (b) a styrene-butadiene radial block copolymer, wherein the styrene content in the copolymer is at least 50% by weight based on the weight of the copolymer, and wherein the butadiene block length and structure results in butadiene domains that are smaller than the wavelength of visible light;
   wherein said process comprises melt-mixing the polyphenylene ether resin in a powder form with the styrene-butadiene radial block copolymer.

* * * * *